United States Patent [19]

Chisholm et al.

[11] 4,373,181
[45] Feb. 8, 1983

[54] DYNAMIC DEVICE ADDRESS ASSIGNMENT MECHANISM FOR A DATA PROCESSING SYSTEM

[76] Inventors: Douglas R. Chisholm, 1531 Ilene Ct., Delray Beach, Fla. 33444; Hobart L. Kurtz, Jr., 425 N.W. 11th St., Boca Raton, Fla. 33432

[21] Appl. No.: 173,586

[22] Filed: Jul. 30, 1980

[51] Int. Cl.³ ............................................. G06F 9/30
[52] U.S. Cl. ................................................... 364/200
[58] Field of Search ... 364/200 MS File, 900 MS File

[56] References Cited
U.S. PATENT DOCUMENTS

| | | | |
|---|---|---|---|
| 4,156,277 | 5/1979 | Seitz et al. | 364/200 |
| 4,212,080 | 7/1980 | Millikin | 364/900 |
| 4,253,087 | 2/1981 | Saal | 340/147R |

OTHER PUBLICATIONS

Rosenberg, "Program Controlled I/O Adress Assignment," IBM Technical disclosure Bulletin, June, 1973, Pages 67-68.

*Primary Examiner*—Harvey E. Springborn

[57] ABSTRACT

A peripheral device address assignment mechanism is described which does not require the use of plugboards or jumpers. This mechanism enables a host processor to select any desired peripheral device and set its device address to any desired value at any desired time. This is accomplished by providing each peripheral device control unit with a loadable device address register for holding the device address assigned to its peripheral device. Each device control unit is further provided with circuitry responsive to the appearance of a unique I/O command on the processor I/O bus and to the activation of a unique set of the I/O bus data lines by the processor for loading into its device address register the desired device address value as supplied thereto by the processor via the I/O bus.

6 Claims, 7 Drawing Figures

DYNAMIC DEVICE ADDRESS ASSIGNMENT MECHANISM FOR A DATA PROCESSING SYSTEM

DESCRIPTION

1. Technical Field

This invention relates to peripheral device addressing mechanisms for enabling a digital computer to address different ones of the various peripheral devices which are coupled to its I/O channel bus.

2. Cross Reference To Related Application

The subject matter of this application is similar to the subject matter of copending U.S. patent application Ser. No. 173,585 entitled "Programmable I/O Device Identification", filed in the name of J. M. McVey on the same day as the present application and assigned to the same assignee as the present application. This copending McVey application describes an alternative way of accomplishing the same end result as is accomplished by the present invention.

A description of the invention set forth in this copending McVey application was published in the *IBM Technical Disclosure Bulletin*, Volume 22, No. 3, pages 882 and 883, in August, 1979.

BACKGROUND ART

In a typical data processing system, various peripheral devices are connected to a central processing unit or processor by means of an input/output (I/O) channel bus associated with the processor. Typical peripheral devices include keyboard/display units, printers, magnetic disk storage units, floppy disk units, communications line controllers and the like. In order to enable the processor to select and communicate with a particular peripheral device, each of the different devices is assigned a different device address. In order to communicate with a particular device, the processor places its device address on the channel bus, such address is recognized by the desired peripheral device and the appropriate circuitry in the device control unit is activated to enable messages and data to be passed from the processor to the peripheral device and vice versa.

Typically, a peripheral device is connected to the processor I/O bus by means of a control unit which is sometimes referred to as an I/O controller. Such control unit or controller may be physically located within the housing of the peripheral device or may be located as a separate physical unit. In either case, its purpose is to enable and control the movement of messages and data from the processor to the peripheral device and vice versa.

The customary way for establishing the device address of a peripheral device is by means of a plugboard mechanism or a jumper mechanism located in the device control unit. For an 8-bit device address, eight sets of plug connections or jumper connections are provided. The plugs or jumpers are then manually added at the appropriate ones of the eight positions to establish the desired 8-bit address code. The control unit compares this plugboard or jumper established address value with the device addresses sent out by the processor on the I/O bus to determine if it is the control unit with which the processor wishes to communicate.

The use of plugboard or jumper mechanisms for establishing the address of a peripheral device has various disadvantages. For one thing, the device address can only be changed by manually changing the plugs or jumpers. This is not a particularly convenient thing to do when it is desired to reconfigure the system to accommodate the attachment of additional or different peripheral devices to the system. It is also not a particularly convenient thing to do when a given peripheral device is removed from one system and connected to another system. In addition to the physical labor, there is also the undesired possibility that the jumper connections might be changed in an incorrect manner, thus causing errors and problems in the subsequent operation of the system. It would be desirable, therefore, to have an alternative solution which did not require the use of plugs or jumpers.

The use of plugboard or jumper mechanisms for establishing device addresses is not a flexible method. The device addresses cannot be dynamically changed during the operation of the data processing system. On the other hand, various desirable procedures and operations could be accomplished on the system if it were possible to program different device addresses into the peripheral devices at different points in time during the operation of the system. For example, certain diagnostic procedures could be performed more efficiently and with the use of less program code in the processor if the processor were able to tell the peripheral device to start using a different device address. In other words, various system economies and improvements could be realized if the processor were capable of reprogramming the device addresses at appropriate points in the operation of the system. This, of course, cannot be done where the device addresses are established by means of plugs or jumpers.

A further disadvantage of plugs and jumpers for device address assignment arises when the circuitry of the device control unit is fabricated on a single large scale integration (LSI) integrated circuit chip. In particular, the use of plugboard or jumper mechanisms increases the number of I/O pins required on the chip. This is because the plug or jumper connections must be located off of the chip in order to be accessible for purposes of initializing or changing same. Thus, these mechanisms must be located off of the chip but must nevertheless be connected to the circuitry on the chip, thus increasing the number of chip I/O connections. For the case of an 8-bit device address, for example, eight additional I/O contacts would be required on the integrated circuit chip. As is known, the finding of enough space on LSI chips for the needed chip I/O connections is frequently a considerable problem. Thus, it would be desirable to eliminate the use of plugboard or jumper mechanisms and to provide another way of establishing device addresses which would reduce the number of chip I/O connections needed for this purpose.

SUMMARY OF INVENTION

This invention provides a peripheral device address assignment mechanism which does not require the use of plugboards or jumpers. This invention enables a host processor to program device addresses into the device control units connected to its I/O channel bus. The host processor can select any desired peripheral device and set its device address to any desired value at any desired time. This can be done not only at power on or initialization time but also with in-line code at any desired point in the operation of the system.

These objectives are achieved by providing each peripheral device control unit with a loadable device address register for holding the device address assigned to its peripheral device. Each control unit further includes circuitry responsive to the appearance of a unique I/O command on the processor I/O bus and to the activation of a unique set of the I/O bus data lines by the processor for loading into its device address register a desired device address as supplied thereto by the processor via the I/O bus. In other words, a different set of data lines is activated for each of the different control units for purposes of selecting the control unit which is to have its device address register loaded. In the simplest embodiment, each of the different control units is coupled to a different one of the data lines for purposes of activating the loading of its device address register. In such embodiment, the processor need only issue the unique I/O command and activate a particular one of its data lines in order to load a particular device address register.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
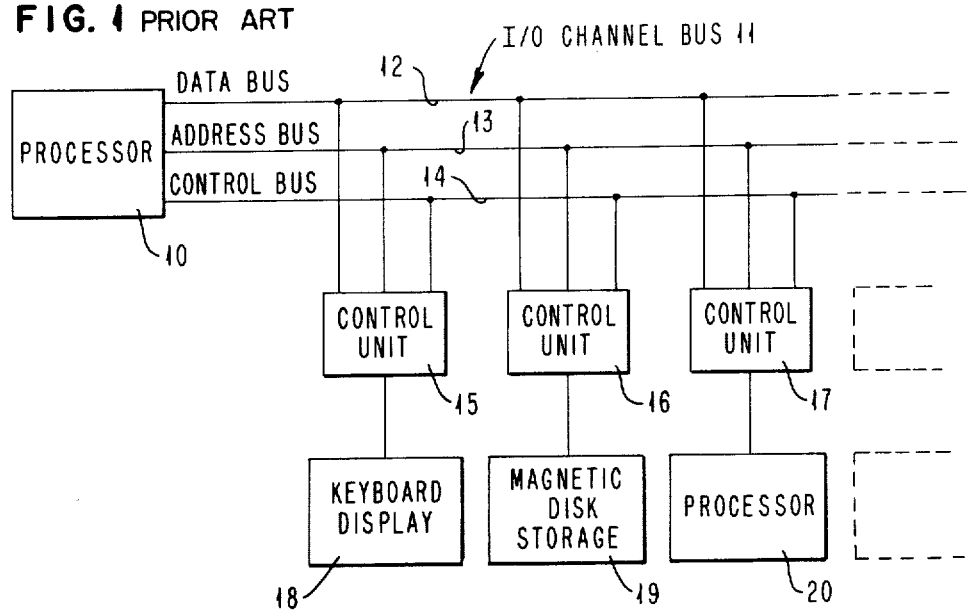
FIG. 1 shows a typical prior art data processing system in which the present invention may be used.

Referring to FIG. 1, there is shown a typical digital computer system or digital data processing system in which the present invention may be used to good advantage. The system includes a host processor 10 having an I/O channel bus 11. The processor I/O bus 11 includes a data bus 12, an address bus 13 and a control bus 14. For sake of example only, the data bus 12 is assumed to have 16 data lines (numbered herein as D$\phi$ through D15) and the address bus 13 is assumed to have 16 address lines (numbered herein as A$\phi$ through A15). Control bus 14 has multiple control lines but the number is not important for purposes of explaining the present invention.

The system of FIG. 1 further includes a plurality of peripheral control units 15, 16 and 17 for coupling a plurality of peripheral devices 18, 19 and 20 to the processor I/O bus 11. The peripheral device 18 may be, for example, a keyboard/display unit, the peripheral device 19 may be, for example, a magnetic disk storage unit, and the peripheral device 20 may be, for example, another processor. Various and sundry other kinds of peripheral devices may also be coupled to the I/O bus 11. For the case of the processor 20, the control unit 17 can also be called a channel-to-channel adapter. Its purpose is to couple the I/O channel of the processor 20 to the I/O channel of the processor 10.

As a general matter, peripheral device control units are sometimes referred to by other names. For example, they are sometimes called I/O controllers. Also, from a physical location standpoint, a peripheral device control unit may be physically located inside the peripheral device cabinet or it may be located as a separate physical unit or it may even be located inside a cabinet which also houses the host processor. As a further consideration, some control units or I/O controllers may have more than one peripheral device connected to them. Thus, the particular arrangement shown in FIG. 1 is intended only as a good example of the various possibilities and the term "control unit" is used herein as a generic term to cover all these various possibilities.

Figure 2:
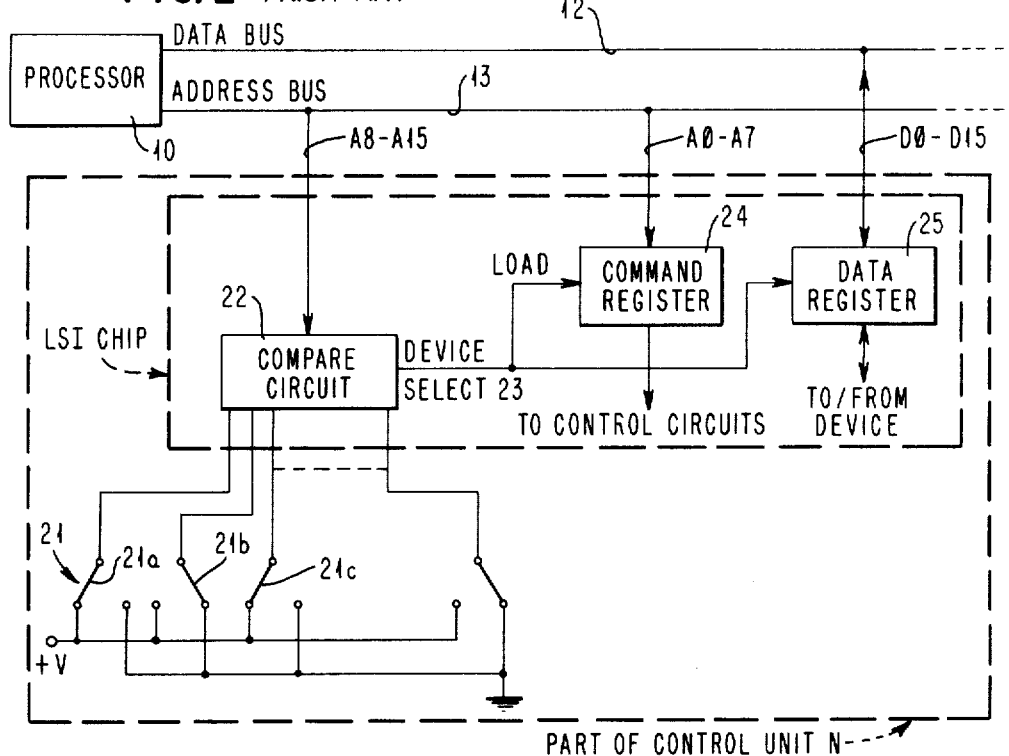
FIG. 2 shows the prior art circuitry whereby a jumper mechanism is used for establishing the device address for a peripheral device.

Referring now to FIG. 2, there is shown the prior art circuitry whereby a jumper mechanism, indicated generally at 21, is used to establish the device address for a typical peripheral device control unit N. FIG. 2 shows only that portion of the control unit N which is pertinent to the present discussion. By appropriate placement of jumpers 21a, 21b, 21c, etc., the jumper mechanism 21 generates a plural-bit binary code pattern which represents the device address for control unit N. For the present example, it is assumed that an 8-bit device address is generated by the jumper mechanism 21.

Figure 3:
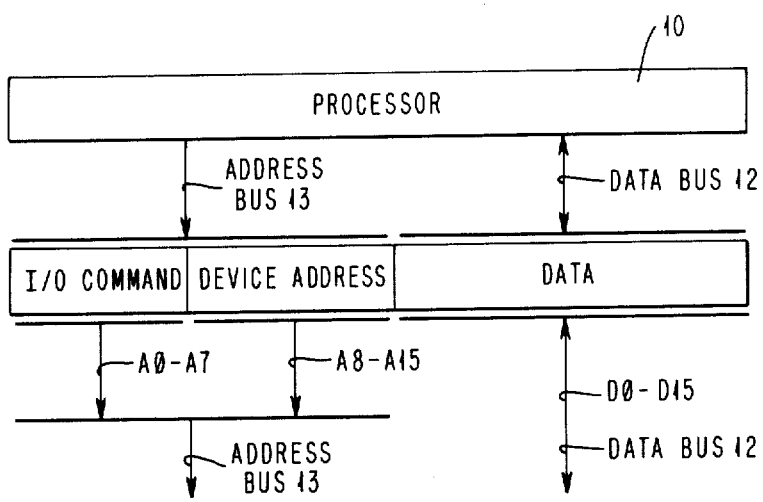
FIG. 3 shows in a diagramatic manner a data transfer protocol used for the channel bus of the FIG. 1 prior art system.

FIG. 3 shows a more or less typical data transfer protocol for the processor I/O bus 11. The processor 10 places an 8-bit I/O command code on lines A$\phi$-A7 of the address bus 13 and an 8-bit device address code on lines A8-A15 of the address bus 13. At the same time, the processor 10 uses data lines D$\phi$-D15 to move a word (two bytes) of data from the processor 10 to the selected control unit or vice versa. The selected control unit is the one identified by the device address appearing on address lines A8-A15. For purposes of moving data from the processor 10 to the control unit, the I/O command will be a Write command and for purposes of moving data in the opposite direction, namely, from the control unit to the processor 10, the I/O command will be a Read command.

As indicated in FIG. 2, the device address code generated by the jumper mechanism 21 is supplied to a first input of a compare circuit 22 and a second input of the compare circuit 22 is connected to address lines A8-A15 of the address bus 13. When the device address sent out by the processor 10 on the address bus 13 matches the device address code established by jumper mechanism 21, the compare circuit 22 generates a device select signal on an output line 23. This device select signal causes the I/O command appearing on the address bus 13 to be loaded into a command register 24 located in the control unit N. For the case of a Write command, it also causes the data word appearing on the data bus 12 to be loaded into a data register 25. For the case of a Read command, on the other hand, it causes the data in the data register 25 to be placed onto the data bus 12 for transmission to the processor 10.

The I/O command located in the command register 24 is supplied to the control circuits (not shown) of the control unit for causing the control unit to take the appropriate action. For the case of a Write command, for example, the control circuits (not shown) may cause the data in the data register 25 to be sent directly on to the peripheral device or it may alternatively cause the data to be temporarily stored in a buffer storage mechanism in the control unit for later transmission to the peripheral device after a sufficient amount of data has been accumulated in such buffer storage mechanism.

The operation of the data register 25 is actually a bit more complex than is indicated in FIG. 2. For one thing, the control circuits need to respond to the command in the command register 24 in order for data register 25 to know whether it is to take in data appearing on the data bus 12 or, conversely, to output data to be placed on data bus 12. This kind of detail is, however, not necessary for an understanding of the present invention. The important consideration for present purposes is that the device select signal appearing at the output of compare circuit 22 enables the control unit N to respond to messages appearing on data and address buses 12 and 13.

The dotted line enclosure labeled "LSI Chip" in FIG. 2 shows the problem encountered when the circuitry of the control unit N is fabricated on an integrated circuit chip. In such case, eight additional I/O contacts are required on the chip for enabling the connection thereto of the address jumper mechanism 21. The jumper mechanism 21 cannot be fabricated as part of the chip because it must be accessible for the initial placement and any later change in placement of the address jumpers 21a, 21b, 21c, etc.

Figure 4:
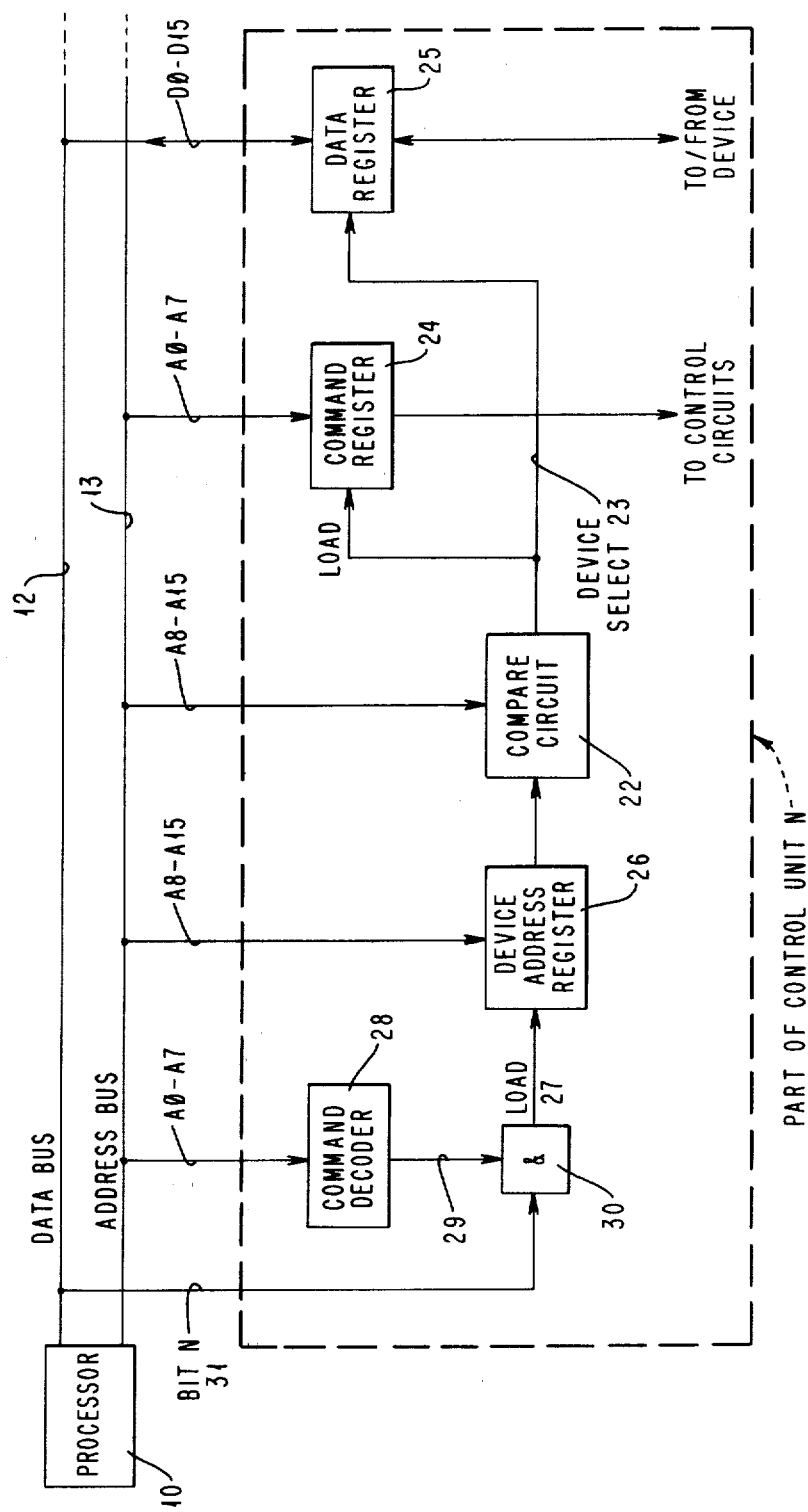
FIG. 4 shows circuitry for use in each of the control units and constructed in accordance with the present invention for enabling the host processor to program device addresses into the control units.

Referring now to FIG. 4, there is shown dynamic device address assignment circuitry for use in each of the control units and constructed in accordance with the present invention for enabling the host processor 10 to program device addresses into the control units. More particularly, FIG. 4 shows the same typical peripheral device control unit N as shown in FIG. 2, but with the jumper mechanism removed and replaced by a dynamic device address assignment mechanism constructed in accordance with the present invention.

Figure 5:
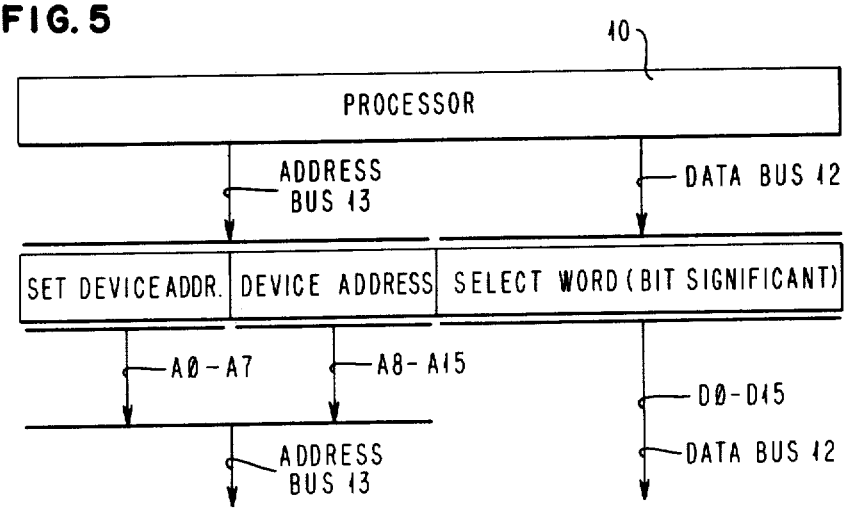
FIG. 5 shows in a diagramatic manner the usage of the processor channel bus when programming a device address into a device control unit.

FIG. 5 shows the usage of the processor I/O bus 11 when programming a device address into a peripheral device control unit such as the control unit N. In particular, the host processor 10 places a unique I/O command on address lines A$\phi$-A7 of the address bus 13 and places the device address to be loaded into the control unit on address lines A8-A15 of the address bus 13. At the same time, the processor 10 places a 16-bit select word on the data lines D$\phi$-D15 of the data bus 12. In this embodiment, the select word on data lines D$\phi$-D15 is bit significant and, in particular, only one of these data lines is placed at the binary one level, the remainder of these data lines being placed at the binary zero level. The particular data line which is activated or placed at the binary one level by the processor 10 determines which one of the control units into which the device address is to be loaded.

For sake of a name, the unique I/O command used for loading a device address into a control unit is called a "Set Device Address" command. Its binary coding is different from and unique relative to the coding of the other I/O commands which are issued by the processor 10.

As indicated in FIG. 4, the dynamic device address assignment mechanism located in the control unit N includes a device address register 26 for holding the device address assigned to the peripheral device connected to the control unit N. In the present example, the device address register 26 is is an 8 bit register. The parallel inputs for the eight stages thereof are coupled to the address lines A8-A15, respectively, of the address bus 13. This enables the device address appearing on address lines A8-A15 to be loaded into the device address register 26 whenever a load signal appears on load control input line 27 of the device address register 26.

During normal non-address assignment operation of the data processing system, the device address in the device address register 26 is supplied to the compare circuit 22 to provide the address value for which such compare circuit 22 seeks a comparison. In other words, the device address provided by register 26 takes the place of the device address provided by the jumper mechanism 21 in the prior art arrangement. Thus, during normal system operation, the address comparison circuitry 22 compares the address in register 26 with the various device addresses sent out by the processor 10 for enabling the control unit N to receive messages from or send messages to the processor 10 whenever the processor places the address of the control unit N on the address bus 13.

The dynamic device address assignment mechanism in the control unit N further includes signal-responsive circuitry responsive to both the appearance of the unique I/O command, namely, the Set Device Address command on the address bus 13 and to the activation of a unique set of the data lines D$\phi$-D15 of the data bus 12 by the processor 10 for loading into the device address register 26 the device address it is desired to assign to the control unit N. In the present embodiment, the unique set of data lines which is activated by the processor 10 is comprised of a single unique one of the data lines D$\phi$-D15. In other words, in this embodiment each unique set has but a single member.

As indicated for the control unit N, this signal-responsive circuitry includes command decoder circuitry 28 coupled to address lines A$\phi$-A7 of the address bus 13 for producing a decoder output signal on decoder output line 29 when the unique Set Device Address I/O command appears on the address bus 13. This signal responsive circuitry further includes a logic circuit represented by AND circuit 30 and having a first input coupled to the output line 29 of the decoder circuitry 28. The logic circuit 30 further includes a second input coupled to a particular one of the I/O bus data lines D$\phi$-D15 by way of line 31. For sake of a name, the line 31 will sometimes be referred to herein as the control unit select line. The logic circuit 30 also includes an output which is coupled to the load control input line 27 of the device address register 26. The logic circuit 30 supplies a load signal via line 27 to the device address register 26 when both the decoder output signal is present on line 29 and the particular data line to which the control unit select line 31 is coupled is activated by the processor 10. For sake of generality, the control unit select line 31 is indicated as being connected to the bit N data line.

As seen from the foregoing, the processor 10 can program a new device address into the control unit N by issuing the Set Device Address command and the desired new address on the address bus 13 and by activating the bit N data line of the data bus 12. Bit N denotes a particular one of the data lines D$\phi$-D15. In response to the issuance of the Set Device Address command and the activation of the bit N data line, AND circuit 30 produces a load signal on line 27 to cause the new device address then appearing on the address bus 13 to be loaded into the device address register 26.

This dynamic device address assignment mechanism reduces the number of chip I/O connections which are required when the control unit circuitry is fabricated on an LSI integrated circuit chip. In particular, only a single additional chip I/O connection, namely, the connection for the control unit select line 31, is required for the address assignment mechanism. In other words, thinking of all of the circuitry for control unit N of FIG. 4 as being fabricated on a single LSI chip, the only additional chip I/O connection required over and above those which are normally required for other purposes is the chip I/O connection for the control unit select line 31. The various other address and data lines A$\phi$-A15 and D$\phi$-D15 are required to be connected to the chip for purposes of normal system operations and do not represent additional connections to the chip. Thus, instead of the eight additional chip I/O connections required by the jumper mechanism of FIG. 2, only one additional chip connection is required for the dynamic device address assignment mechanism of FIG. 4.

Figure 6:
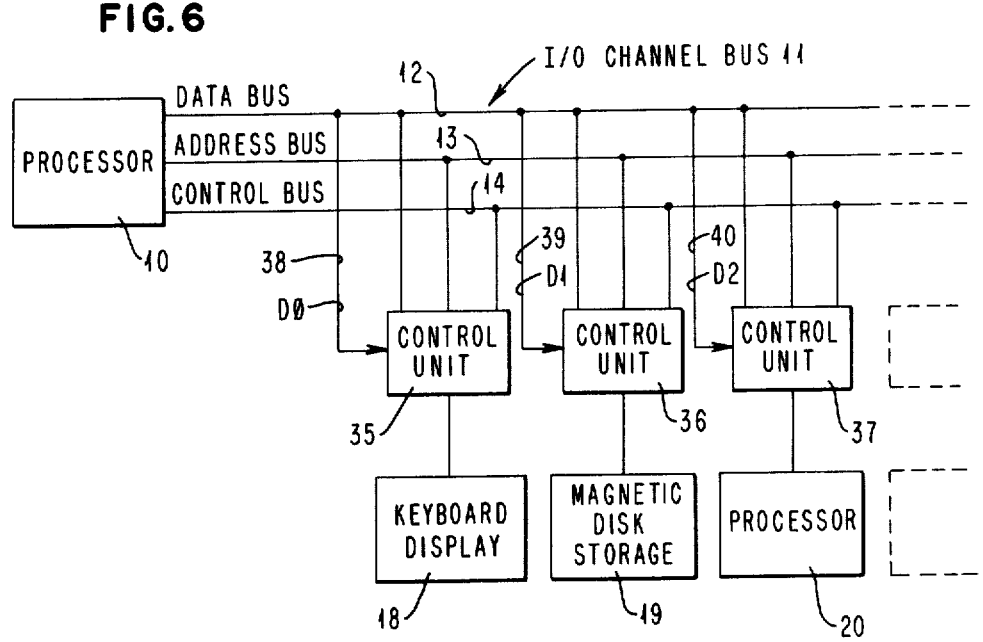
FIG. 6 shows the data processing system of FIG. 1 as modified for use with the present invention; and, FIG. 7 shows a further embodiment of the invention whereby encoded data line signals may be used to control the selection of the control unit which is to have its device address register loaded.

Referring to FIG. 6, there is shown the data processing system of FIG. 1 as modified for use with the present invention. As indicated in FIG. 6, the control units 15, 16 and 17 of FIG. 1 are replaced by control units 35, 36 and 37. Each of these control units 35, 36 and 37 is constructed in the manner indicated for the control unit N in FIG. 4 so as to include a dynamic device address assignment mechanism of the kind shown in FIG. 4. The control unit select lines for these control units 35, 36 and 37 are indicated by lines 38, 39 and 40, respectively. The control unit select line 38 is, for example, connected to the data bus line D$\phi$, the control unit select line 39 is, for example, connected to the data bus line D1, and the control unit select line 40 is, for example, connected to the data bus line D2. The particular data bus lines to which the select lines 38, 39 and 40 are connected is not critical. The important consideration is that each of these select lines 38, 39 and 40 be connected to a different one of the data bus lines.

To load a new device address into the control unit 37, for example, the processor 10 would issue the unique Set Device Address command and, at the same time, activate only the data bus line D2.

Figure 7:
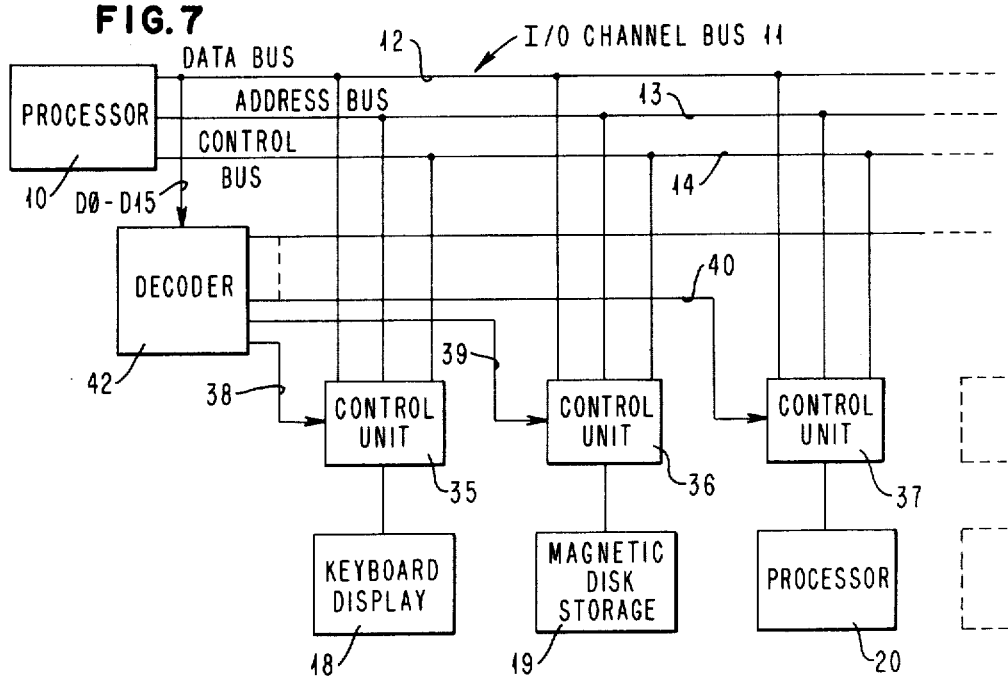

Referring now to FIG. 7, there is shown a further embodiment of the invention whereby encoded data bus data line signals may be used to control the selection of the control unit which is to have its device address register loaded. The control units 35, 36 and 37 are the same as in FIG. 6 except that, in this case, the control unit select lines 38, 39 and 40 are connected to different outputs of a decoder 42. The decoder 42 receives as an input the 16 data lines D$\phi$-D15 of the data bus 12. For any given binary code pattern on data lines D$\phi$-D15, the decoder 42 will activate one and only one of its various output lines. In this embodiment and with reference to FIG. 5, the select word used to load a device address into a control unit is no longer bit significant. Instead, the select word is encoded to provide a unique and different binary code value for each of the different control units. The binary code value selected for a particular control unit is the value needed by the decoder 42 to cause it to activate the decoder output line to which that particular control unit is connected.

The use of encoded select words on the data bus 12 and the use of the decoder 42 enables a much larger number of control units to be provided with the dynamic device address assignment mechanisms. For the case of a 16-bit data bus, for example, the decoder 42 could provide up to 65,536 different and unique output lines. It is unlikely that anywhere near this number of control units would ever be associated with a single host processor.

For many systems having a 16-bit data bus, it would probably not be necessary to use the decoder 42. The embodiment of FIG. 6 wherein each control unit is connected to a single data bus line would probably be sufficient. There would probably not be more than sixteen control units connected to the processor I/O bus 11. The use of the decoder 42 would be more likely to occur for the case of a processor having a smaller number of data bus lines. Thus, for example, for the case of a processor having an 8-bit data bus, the use of the decoder 42 might become necessary since it might be desired to connect more than eight control units to the processor I/O bus. For an 8-bit data bus, the decoder 42 could provide up to 256 different and unique output lines.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a peripheral control unit for coupling a peripheral device to a processor by means of a processor I/O bus having data, address and control lines, wherein the peripheral device is identified by means of a device address assigned thereto, a dynamic device address assignment mechanism comprising:

a device address register for holding the device address assigned to the peripheral device;

and circuitry responsive to the appearance of a unique I/O command on the I/O bus and to the activation of a unique set of the I/O bus data lines by the processor for loading into the device address register an address supplied to the I/O bus address lines by the processor for enabling such address to become the assigned device address.

2. In a peripheral control unit for coupling a peripheral device to a processor by means of a processor I/O bus having data, address and control lines, wherein the peripheral device is identified by means of a device address assigned thereto, a dynamic device address assignment mechanism comprising:

a device address register for holding the device address assigned to the peripheral device;

address comparison circuitry for comparing the address on the I/O bus address lines with the assigned device address stored in the device address register for enabling the control unit to receive signals from the processor when the address on the I/O bus address lines is the same as such assigned address;

and signal-responsive circuitry responsive to the appearance of a unique I/O command on the I/O bus and to the activation of a unique set of the I/O bus data lines by the processor for loading into the device address register an address supplied to the I/O bus address lines by the processor for enabling such address to become the assigned device address.

3. In a peripheral control unit for coupling a peripheral device to a processor by means of a processor I/O bus having data, address and control lines, wherein the peripheral device is identified by means of a device address assigned thereto, a dynamic device address assignment mechanism comprising:

a device address register for holding the device address assigned to the peripheral device;

address comparison circuitry for comparing the address on the I/O bus address lines with the assigned device address stored in the device address register for enabling the control unit to receive signals from the processor when the address on the I/O bus address lines is the same as such assigned address;

and signal-responsive circuitry responsive to the appearance of a unique I/O command on the I/O bus and to the activation of a particular one of the I/O bus data lines by the processor for loading into the device address register the address then appearing on the I/O bus address lines for enabling such address to become the assigned device address.

4. A dynamic device address assignment mechanism in accordance with claim 2 wherein the signal-responsive circuitry includes decoder circuitry coupled to the I/O bus for producing a decoder output signal when the unique I/O command appears on the I/O bus.

5. A dynamic device address assignment mechanism in accordance with claim 4 wherein:

the signal-responsive circuitry further includes a logic circuit having a first input coupled to the output of the decoder circuitry, a second input coupled to said particular one of the I/O bus data lines and an output coupled to the device address register for supplying a load signal to the device address register when both the decoder output signal is present and the particular data line to which the first input of the logic circuit is coupled is activated by the processor.

6. In a data processing system having a processor, a processor I/O bus, a plurality of peripheral devices and a plurality of control units for coupling the peripheral devices to the processor I/O bus, wherein each peripheral device is identified by means of a different device address assigned thereto, a dynamic device address assignment apparatus comprising:

a first device address register located in a first control unit for holding the device address assigned to its peripheral device;

a second device address register located in a second control unit for holding the device address assigned to its peripheral device;

circuitry responsive to the appearance of a unique I/O command on the I/O bus and to the activation of a first unique set of the data lines of the I/O bus by the processor for loading into the first device address register a first address supplied to the I/O bus by the processor for enabling such address to become the assigned device address;

and circuitry responsive to the appearance of the unique I/O command on the I/O bus and to the activation of a second and different unique set of the data lines of the I/O bus by the processor for loading into the second device address register a second address supplied to the I/O bus by the processor for enabling such address to become the assigned device address.

* * * * *